United States Patent
Nakatani et al.

(10) Patent No.: US 6,849,028 B2
(45) Date of Patent: Feb. 1, 2005

(54) PROPELLING TRANSMISSION CONTROL APPARATUS FOR A WORKING VEHICLE HAVING A HYDROSTATIC STEPLESS TRANSMISSION

(75) Inventors: Yasunobu Nakatani, Sakai (JP); Yoshifumi Horiuchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/652,584

(22) Filed: Aug. 29, 2003

(65) Prior Publication Data

US 2004/0163490 A1 Aug. 26, 2004

(30) Foreign Application Priority Data

Feb. 25, 2003 (JP) ........................................ 2003-047534

(51) Int. Cl.[7] .............................................. B60K 17/10
(52) U.S. Cl. ........................... 477/52; 477/68; 477/111; 74/730.1; 74/473.16
(58) Field of Search ........................... 477/52, 68, 107, 477/111; 74/730.1, 473.16, 473.17, 473.19

(56) References Cited

U.S. PATENT DOCUMENTS

| | | | |
|---|---|---|---|
| 3,952,512 A | * | 4/1976 | Feller ........................... 477/111 |
| 3,990,235 A | * | 11/1976 | Bauchet ........................ 60/413 |
| 4,023,637 A | * | 5/1977 | Jackovich ................... 180/6.48 |
| 4,136,855 A | | 1/1979 | Morrow, Sr. et al. |
| 4,901,529 A | * | 2/1990 | Iino et al. ...................... 60/489 |
| 5,207,060 A | | 5/1993 | Sheets |
| 6,151,895 A | | 11/2000 | Matsura |
| 6,508,328 B1 | * | 1/2003 | Kenyon et al. .............. 180/308 |
| 6,675,577 B2 | * | 1/2004 | Evans .......................... 60/445 |
| 2002/0139600 A1 | | 10/2002 | Nakatani et al. |
| 2003/0226357 A1 | | 12/2003 | Nakatani |

FOREIGN PATENT DOCUMENTS

| | | |
|---|---|---|
| GB | 1529247 | 10/1978 |
| GB | 2257496 | 1/1993 |
| JP | 11-59210 | 3/1999 |
| JP | 2000-220737 | 8/2000 |
| JP | 2002-283860 | 10/2002 |

* cited by examiner

*Primary Examiner*—Sherry Estremsky
(74) *Attorney, Agent, or Firm*—Webb Ziesenheim Logsdon Orkin & Hanson, P.C.

(57) ABSTRACT

A propelling transmission control apparatus for a working vehicle having a hydrostatic stepless transmission comprises a variable displacement type hydraulic pump (35), a change speed control mechanism (80) for converting a displacement of a control device (55) to a control displacement for varying a swash plate angle of the hydraulic pump, a fixed displacement main hydraulic motor (36) and a variable displacement auxiliary hydraulic motor (37) connected in series to the hydraulic pump. A common output shaft receives rotational output from both motors. A control piston (35) varies the swash plate angle of the auxiliary hydraulic motor, is connected to a pressure oil supply line (39) for supplying both hydraulic motors with pressure oil, and is operable to vary the swash plate angle of the auxiliary hydraulic motor (37) such that the auxiliary hydraulic motor (37) has an increased volume with a pressure increase applied to the control piston (38).

4 Claims, 10 Drawing Sheets

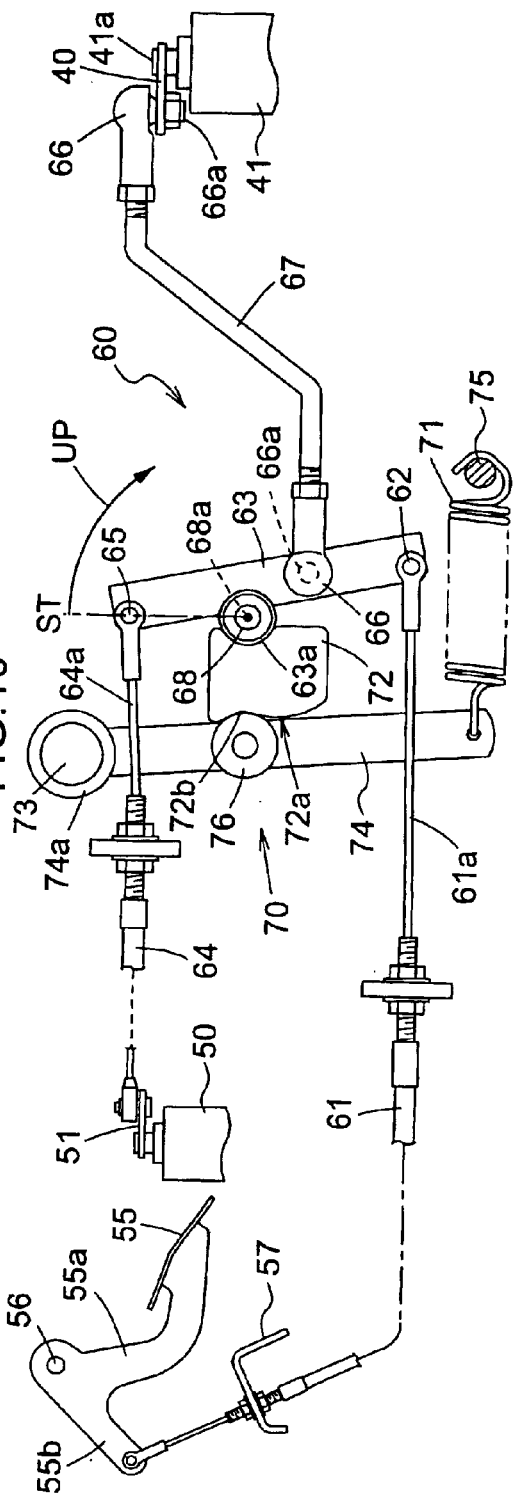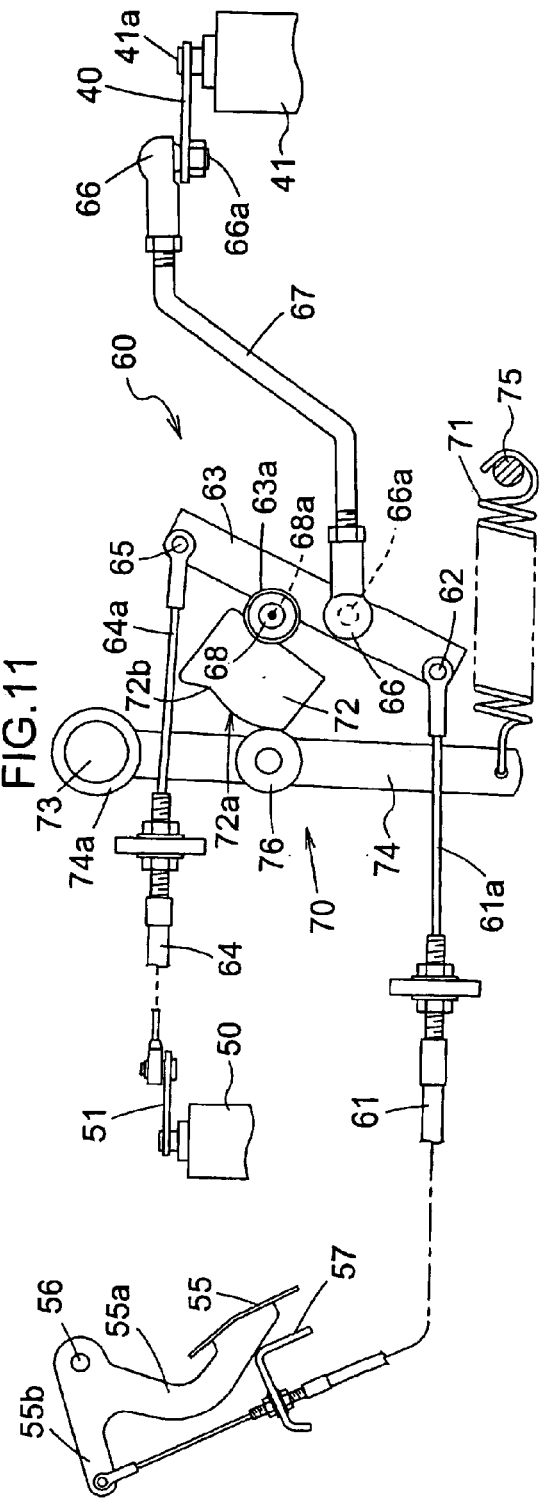

PROPELLING TRANSMISSION CONTROL APPARATUS FOR A WORKING VEHICLE HAVING A HYDROSTATIC STEPLESS TRANSMISSION

BACKGROUND OF THE INVENTION

1. Field of the Invention

The present invention relates to a propelling transmission control apparatus for a working vehicle such as an agricultural working vehicle, a transport vehicle, a lawn mower and the like utilizing a hydrostatic stepless transmission (HST) as a propelling change speed device.

2. Description of the Related Art

A hydrostatic stepless transmissions for use in a tractor exemplifying the above-noted working vehicles often employs a construction in which a swash plate angle of a hydraulic pump of the variable displacement type is varied by pedal operation to steplessly change an operating speed of a hydraulic motor of the fixed displacement type. The output speed of the motor is further changed into a plurality of speeds through a gear-type change speed device to drive wheels. In order to enable the operator to effect the pedal operation lightly and smoothly, a construction has been implemented in which the swash plate of the hydraulic pump is operable by a hydraulic servomechanism (see Japanese Patent Application "Kokai" No. 2002-283860, for example).

In general, a working vehicle using a hydrostatic stepless transmission as a propelling change speed device does not control speed in response to variations in propelling load. Instead, the operator is expected to effect a speed reduction control when he or she determines based on an engine sound that the engine is in an overload condition. Such a change speed operation as relying on the operator to determine engine load conditions would not only impose an excessive burden on the operator, but also lower operating efficiency.

In order to relieve the operator from the troublesome change speed operation to be effected in response to an engine load, research and development efforts are being conducted on a device for detecting load variations with a sensor from variations in the rotating speed of the engine, and automatically changing speed based on the load variations. However, such a device tends to result in an increased manufacturing cost since various sensors and complicated electric systems are required, and thus a disadvantage that the device may be installed only on high-end machines.

SUMMARY OF THE INVENTION

The present invention has been made having regard to the state of the art noted above, and its object is to provide a propelling transmission control apparatus having a relatively inexpensive construction free from any complicated electric systems with sensors for automatically responding to variations in engine load.

In order to fulfill the above-noted object, according to a propelling transmission control apparatus for a working vehicle having a hydrostatic stepless transmission of the present invention, the apparatus comprises a variable displacement type hydraulic pump with a swash plate angle variable to vary a discharge therefrom, a change speed control mechanism for converting a displacement of a control device by the operator to a control displacement for varying the swash plate angle of the hydraulic pump, a main hydraulic motor and an auxiliary hydraulic motor connected in series to the hydraulic pump, the main hydraulic pump being a fixed displacement type having a fixed swash plate angle, the auxiliary hydraulic motor being a variable displacement type having a variable swash plate angle, a common output shaft for receiving rotational output from the main and auxiliary motors, and a control piston for varying the swash plate angle of the auxiliary hydraulic motor, the control piston being connected to a pressure oil supply line for supplying the main and auxiliary hydraulic motors with pressure oil, to transmit pressure variations in the pressure oil supply line to the control piston, wherein the control piston is operable to vary the swash plate angle of the auxiliary hydraulic motor such that the auxiliary hydraulic motor has an increased volume with a pressure increase applied to the control piston.

With this construction, the heavier the propelling load becomes, the higher hydraulic pressure in the pressure oil supply line is applied to the main and auxiliary hydraulic motors. Therefore, the swash plate angle of the auxiliary hydraulic motor becomes large by action of the control piston operated by the hydraulic pressure, thereby increasing the volume of the auxiliary hydraulic motor. Thus, the total volume of the main and auxiliary motors is increased while the rotating speed of the common output shaft is reduced. That is, speed is automatically reduced with an increase in the propelling load to increase output torque.

Conversely, the lighter the propelling load becomes, the lower hydraulic pressure in the pressure oil supply line is applied to both the hydraulic motors. Thus, the total volume of the main and auxiliary motors is reduced while the rotating speed of the common output shaft is increased. That is, speed is automatically increased with a decrease in the propelling load.

Where a minimum swash plate angle of the auxiliary hydraulic motor is set to 0°, for example, the volume of the auxiliary hydraulic motor becomes zero and output is taken only from the main hydraulic motor in time of a load equal to or less than a predetermined value. When the load exceeds the predetermined value, the swash plate angle of the auxiliary hydraulic motor becomes larger than 0° to reduce speed.

Hence, it is possible to automatically effect transmission control in response to variations in the load with the relatively inexpensive construction employing only the hydraulic system and not any electric system, which enables the operator to effect a light and smooth driving control.

In one preferred embodiment of the invention, the change speed control mechanism includes a hydraulic servomechanism having a hydraulic servo valve operable in response to the displacement of the control device applied as a control input, and a servo cylinder for adjusting the swash plate angle of the hydraulic pump. With this construction, the operator operates the control device to operate the hydraulic servo valve of the hydraulic servo mechanism, based on which a hydraulic servo actuator such as the servo cylinder is actuated whereby the swash plate of the hydraulic pump is operated to an angle corresponding an amount of operation of the change speed control device. When the propelling load becomes great, an increase in the swash plate angle of the auxiliary hydraulic motor is adjusted as noted above to effect an automatic speed reduction and torque increase. The propelling load is further increased after the swash plate angle of the auxiliary hydraulic motor reaches a maximum, the discharge pressure of the hydraulic pump is increased to increase a hydraulic reaction force applied to the swash plate of the hydraulic pump. This reaction force acting on the swash plate becomes greater than an operating force of the hydraulic servo actuator in the hydraulic servomechanism to cause the swash plate of the hydraulic pump to return to a neutral position. That is, when the load increases beyond a predetermined range, the hydraulic pump per se is forcibly operated in a direction to reduce speed regardless of an operated position of the change speed control device. Thus, an output torque can be increased while effecting the automatic speed reduction fully corresponding to a wide range of load variations.

According to another preferred embodiment of the invention, the hydraulic servomechanism has, applied thereto as a system pressure therefor, a charge pressure for a change speed hydraulic circuit having the main hydraulic pump and the main and auxiliary hydraulic motors. With this construction, a charge oil line for receiving pressure oil from a charge pump is connected to an oil line of the hydraulic servomechanism, thereby to realize a simple servomechanism operable under low pressure.

According to a further preferred embodiment of the present invention, the control device is operatively connected to a speed adjusting device for an engine, the speed adjusting device being operable to a high speed rotation in response to a shifting operation of the control device to high speed drive, and to a low speed rotation in response to a shifting operation of the control device to low speed drive. With this construction, the rotating speed of the engine is reduced in response to the speed change control device operated to low speed drive while being automatically increased in response to the control device operated to high speed drive. Thus, the speed change control device is operated to high speed drive when a load is applied thereby to increase the rotating speed of the hydraulic pump to raise pressure in the hydraulic circuit. As a result, an automatic speed reduction is effected utilizing the auxiliary hydraulic motor to increase output torque. Thus, a change speed operation may be carried out with an excellent accelerating efficiency sensitively responding to the operation of the change speed control device and to quickly increase output torque when a heavy load is applied thereby to enhance driving efficiency.

Other features and advantages of the invention will be apparent from the following description of the embodiments to be taken with reference to the accompanying drawings.

BRIEF DESCRIPTION OF THE DRAWINGS

FIG. 10 is a side view of a pedal control device in a pedal releasing state; and FIG. 11 is a side view of the pedal control device in a pedal depressing state.

DESCRIPTION OF THE PREFERRED EMBODIMENTS

Figure 1:
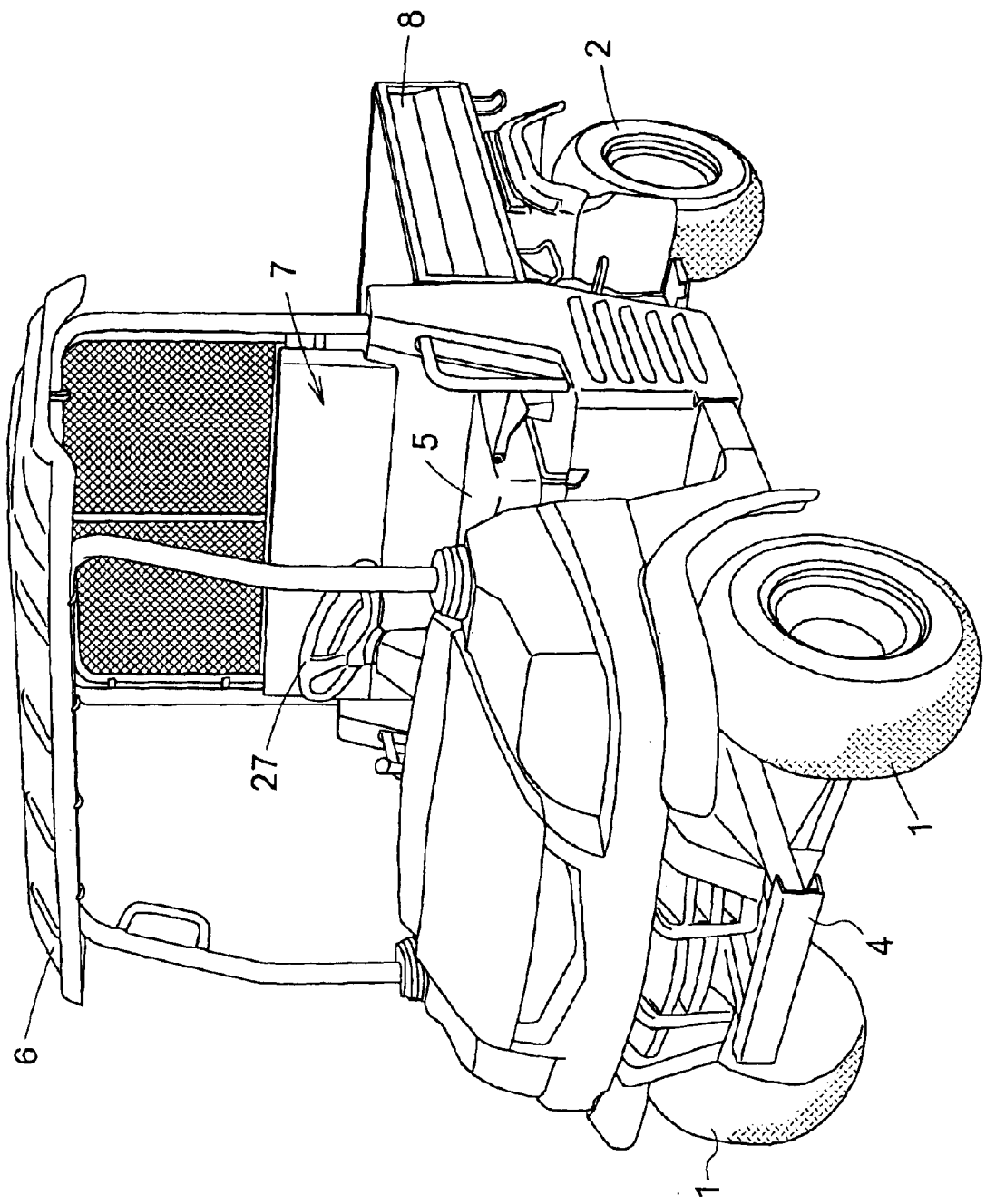
FIG. 1 is a perspective view of a working vehicle having a propelling change speed control apparatus according to the present invention.
Figure 2:
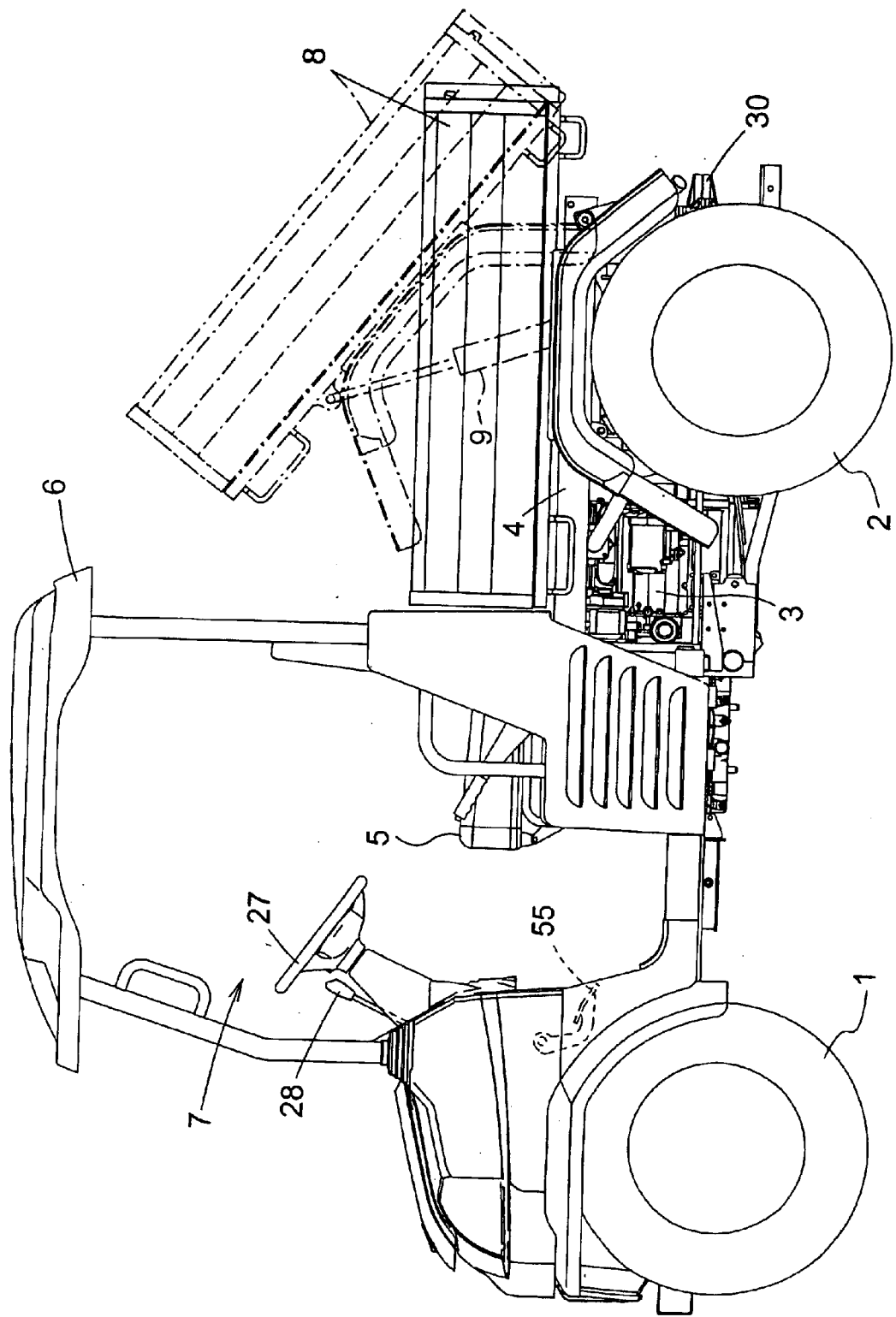
FIG. 2 is a side elevation of the working vehicle.
Figure 3:
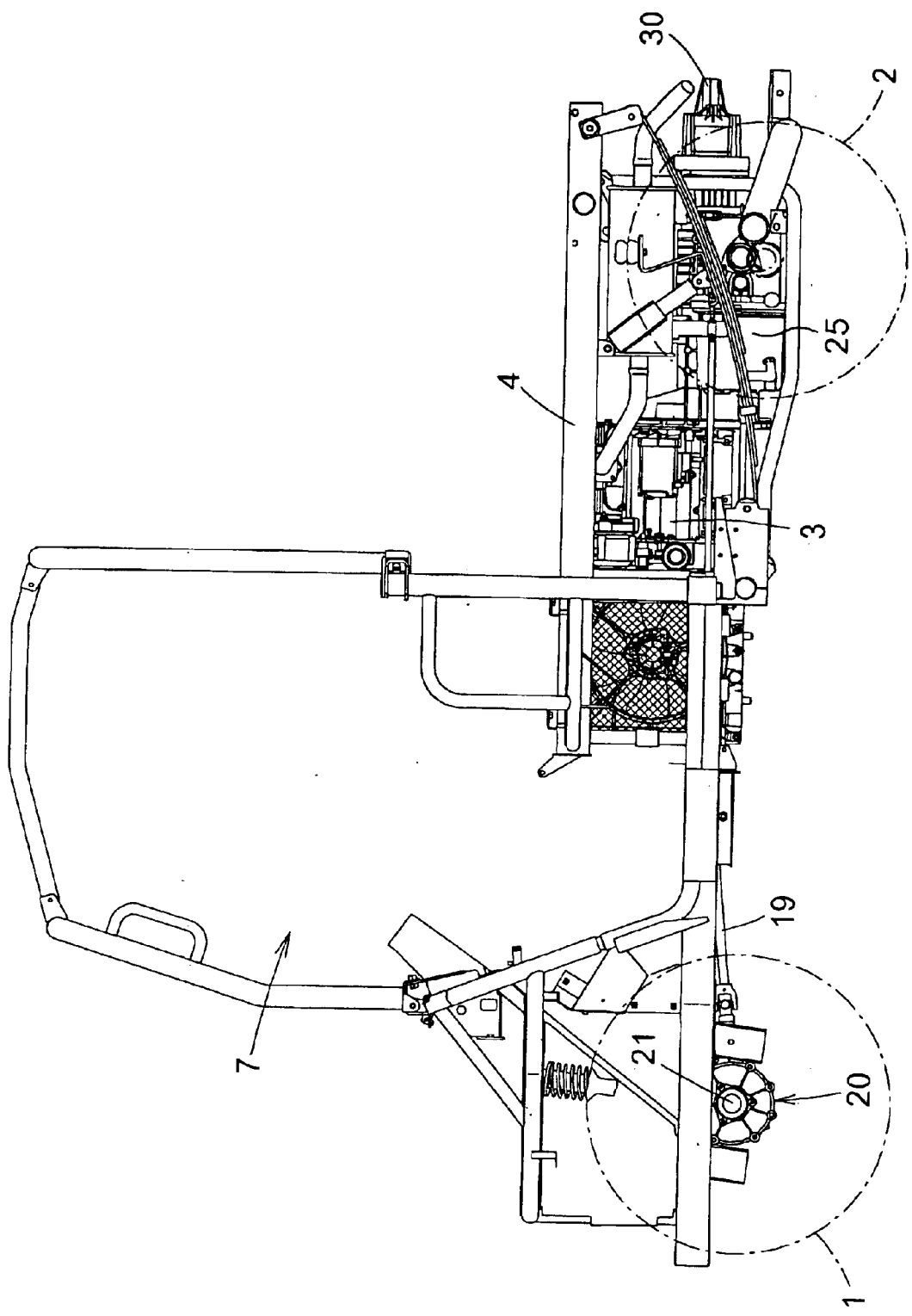
FIG. 3 is a side elevation of a vehicle body frame.

As shown in FIGS. 1 through 3, a working vehicle is supported above the ground by a right and left pair of dirigible front tire wheels 1 and a right and left pair of rear tire wheels 2. The vehicle includes a body frame 4 and an engine 3 mounted on the frame between the front and rear wheels. The working vehicle further includes a driver's section 7 mounted at a front portion of the frame 4 and having a driver's seat 5 and a sunshade 6, and a deck 8 mounted at a rear portion of the frame 4 to be vertically pivotable about a transverse axis disposed at the rear of the deck by a dump cylinder 9.

Figure 4:
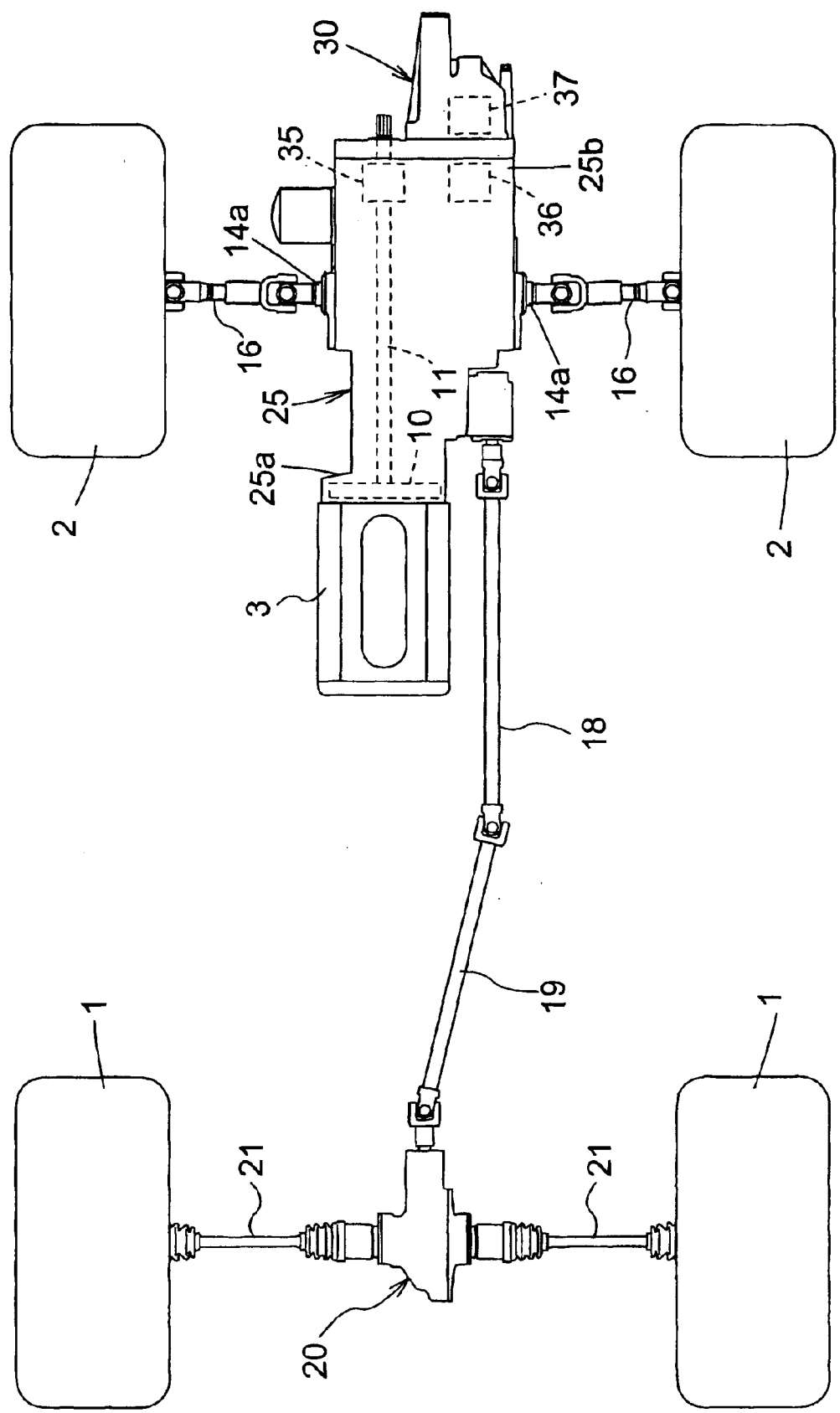
FIG. 4 is a plan view of a propelling transmission apparatus.
Figure 5:
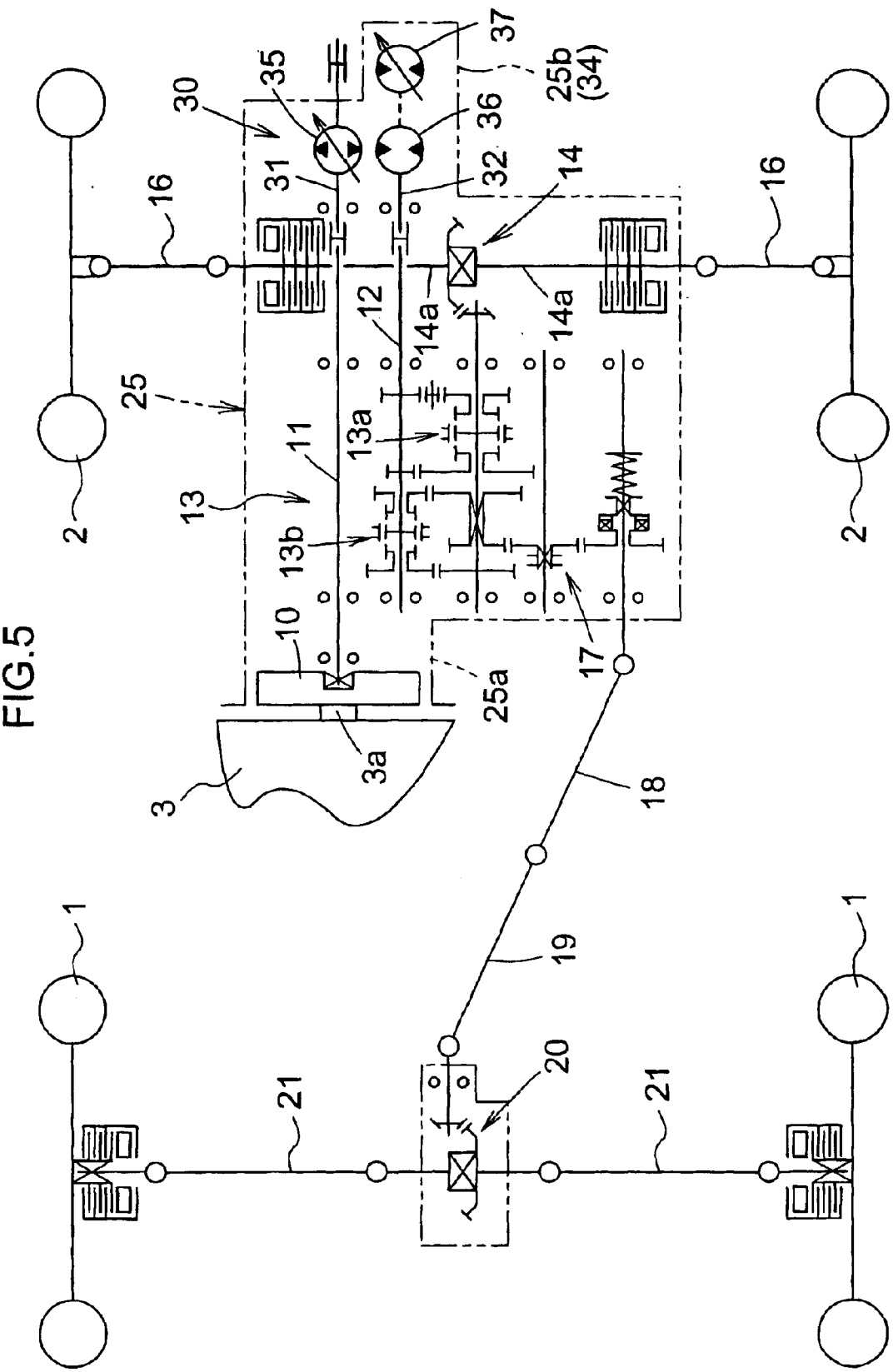
FIG. 5 is a schematic view of the propelling transmission apparatus.

Output from the engine 3 is transmitted to the front and rear wheels 1 and 2 through a propelling transmission device as shown in FIGS. 4 and 5. More particularly, the output is transmitted from an output shaft 3a with a flywheel 10 mounted rearwardly of the engine 3 to an input shaft 31 of a hydrostatic stepless transmission 30 through a rotary shaft 11. Output from an output shaft 32 of the stepless transmission 30 is inputted to a gear transmission 13 through a rotary shaft 12, and then inputted to a rear wheel differential mechanism 14. Output from right and left output shafts 14a of the rear wheel differential mechanism 14 is transmitted to the rear wheels 2 through rotary shafts 16. Output for the front wheels from the gear transmission 13 is inputted to a front wheel differential mechanism 20 through a clutch mechanism 17 for establishing and breaking power transmission to the front wheels 1, and rotary shafts 18 and 19. Output from the front wheel differential mechanism 20 is transmitted to the front wheels 1 through right and left rotary shafts 21.

The gear transmission 13, rear wheel differential mechanism 14, clutch mechanism 17, and rotary shafts 11 and 12 are housed in a transmission case 25 connected to the rear of the engine 3 at a flywheel casing portion 25a. The rear wheel differential mechanism 14 is arranged in the case rearwardly of the gear transmission 13.

A shift gear 13a is shiftable to switch the gear transmission 13 between a forward drive state in which rotational output in one direction taken from the stepless transmission 30 is switched to forward drive and outputted, and a backward drive state in which rotational output in one direction taken from the stepless transmission 30 is switched to backward drive and outputted. A shift gear 13b is shiftable to change the forward drive into two speeds, i.e. high speed and low speed, to be outputted. The shift gears 13a and 13b are selectively operable by a shift lever 28 disposed laterally of a steering wheel 27 to be operable along an H-shaped path.

As illustrated in FIGS. 4 and 5, the stepless transmission 30 is mounted rearwardly of the gear transmission 13 housed in the transmission case 25 and also rearwardly of the right and left output shafts 14a of the rear wheel differential mechanism 14.

Figure 6:
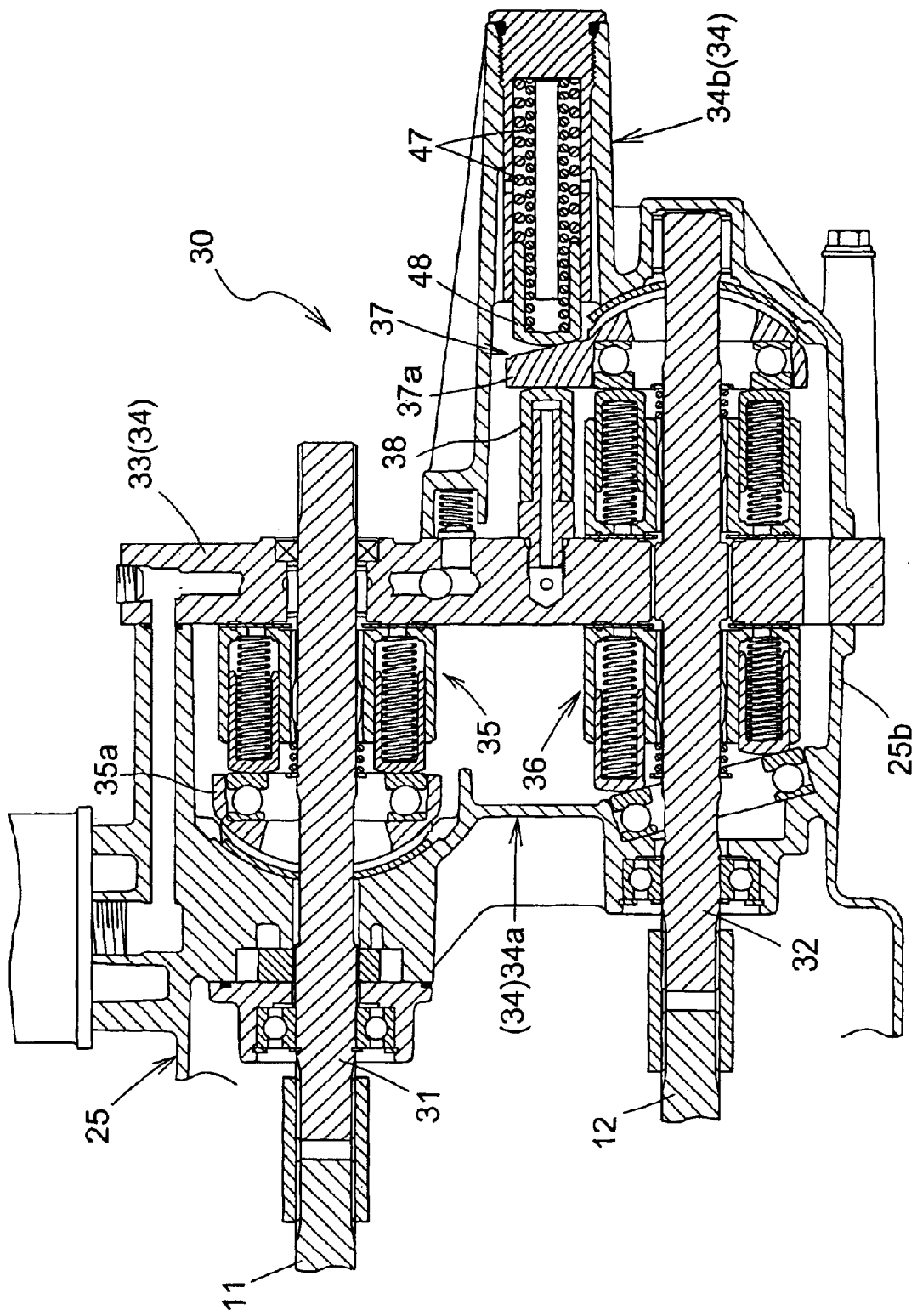
FIG. 6 is a sectional view of a stepless transmission in a neutral stop state.

Referring to FIG. 6, the stepless transmission 30 is the hydrostatic type including a housing 34 having a port block 33 connected to the rear end of the transmission case 25, a variable displacement hydraulic pump 35 of the axial plunger type and a fixed displacement main hydraulic motor 36 of the axial plunger type, both accommodated in the housing 34 forwardly of the port block 33, and a variable displacement auxiliary hydraulic motor 37 of the axial plunger type accommodated in the housing 34 rearwardly of the port block 33. The output shaft 32 common to the main and auxiliary hydraulic motors 36 and 37 acts as the output shaft of the stepless transmission 30.

The housing 34 of the stepless transmission 30 is cast at the same time when the transmission case 25 is cast, and formed integrally with the rear of a portion 25b of the transmission case 25 for accommodating the rear wheel differential mechanism 14. The housing 34 includes a first housing body 34a for accommodating the hydraulic pump 35 and main hydraulic motor 36, the port block 33 detachably screwed to the first housing body 34a for closing an opening of the housing body 34a directed rearward of the vehicle body, and a second housing body 34b bolted to a surface of the port block 33 directed rearward of the vehicle body.

Figure 7:
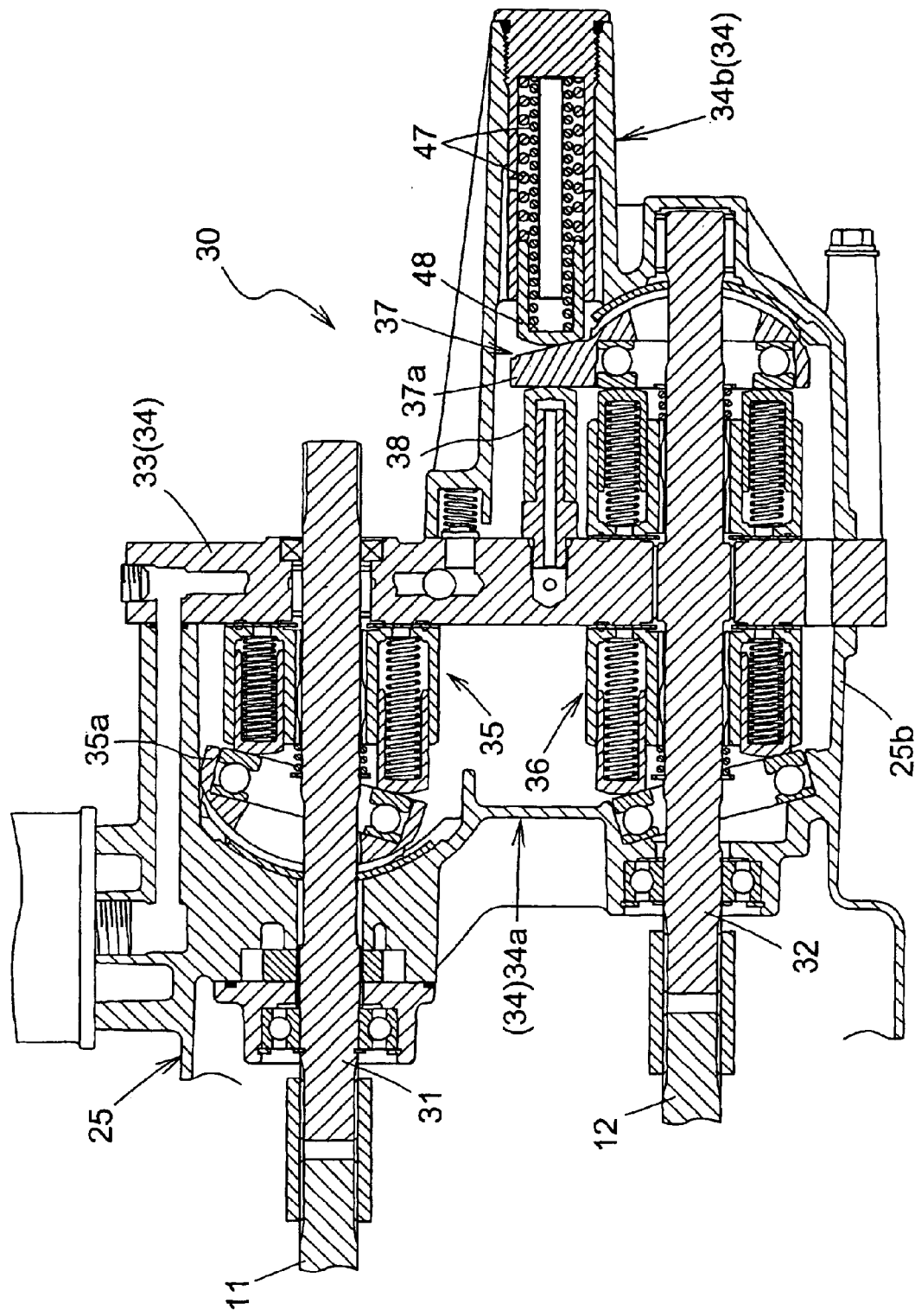
FIG. 7 is a sectional view of the stepless transmission in a state of running under a normal load.

Referring to a circuit diagram of FIG. 9, a swash plate 35a of the hydraulic pump 35 of the stepless transmission 30 is interlocked with a shift pedal 55 arranged around the driver's foot in the driver's section 7, through a hydraulic servomechanism 80 as described later. As shown in FIG. 6, the swash plate 35a is returned to and maintained in neutral (0°) to establish a stop state with release of the shift pedal 55. On the other hand, as shown in FIG. 7, the swash plate 35a has a large tilting angle to increase discharge with depression of the shift pedal 55, to increase rotating speed of the output shaft 32.

The hydraulic servomechanism 80 will be described hereinafter. Referring to FIG. 10, the stepless transmission 30 has a change speed control 40 connected to an outer end of a rotary control shaft 41a of a hydraulic servo valve 41 to be pivotable in unison with rotation of the control shaft 41a. As shown in FIG. 9, the transmission case 25 has a servo cylinder 44 mounted therein, connected to the servo valve 41 through oil lines 42 and linked with the valve through a feedback mechanism 43. Action of the servo cylinder 44 is transmitted to a swash plate operating portion of the hydraulic pump 35. Thus, a change speed operation of the stepless transmission 30 is effected by the change speed control 40. The hydraulic servomechanism 80 has a pressure oil input port connected to a charge oil line 81 for refilling a change speed oil circuit with pressure oil from a charge pump 45 through an oil line 82. As a result, the system pressure of the hydraulic servomechanism 80 is rendered equal to the charge pressure.

With this construction, the change speed control 40 is pivoted about the axis of the rotary control shaft 41a to rotate the rotary control shaft 41a thereby to switch the hydraulic servo valve 41 to a drive state. The hydraulic servo valve 41 supplies pressure oil from the charge pump 45 to the servo cylinder 44 through the oil lines 42. Then, the servo cylinder 44 is driven to vary the swash plate angle of the hydraulic pump 35 such that a drive speed of the hydraulic pump 35 is changed to change a speed state of the stepless transmission 30. At this time, the displacement of the servo cylinder 44 is fed back to the hydraulic servo valve 41 through the feedback mechanism 43. When the stepless transmission 30 reaches a control target (target speed) corresponding to a control position of the change speed control 40, the hydraulic servo valve 41 is switched to a neutral position to maintain the stepless transmission 30 at a speed corresponding to the control target.

The auxiliary hydraulic motor 37 has a swash plate 37a held at the front and back thereof by a control piston 38 and a return piston 48 urged forward by a return spring 47, both the pistons being mounted in the rear of the housing 34. Referring to FIG. 6, the angle of the swash plate 37a of the auxiliary hydraulic motor 37 becomes neutral (0°) as the control piston 38 is retracted to a forward limit of movement, and becomes large with a backward advance of the control piston 38 against the return spring 47. The return spring 47 is given an initial compression when incorporated in place and thus the swash plate 37a is urged to the neutral position under a predetermined load.

Figure 9:
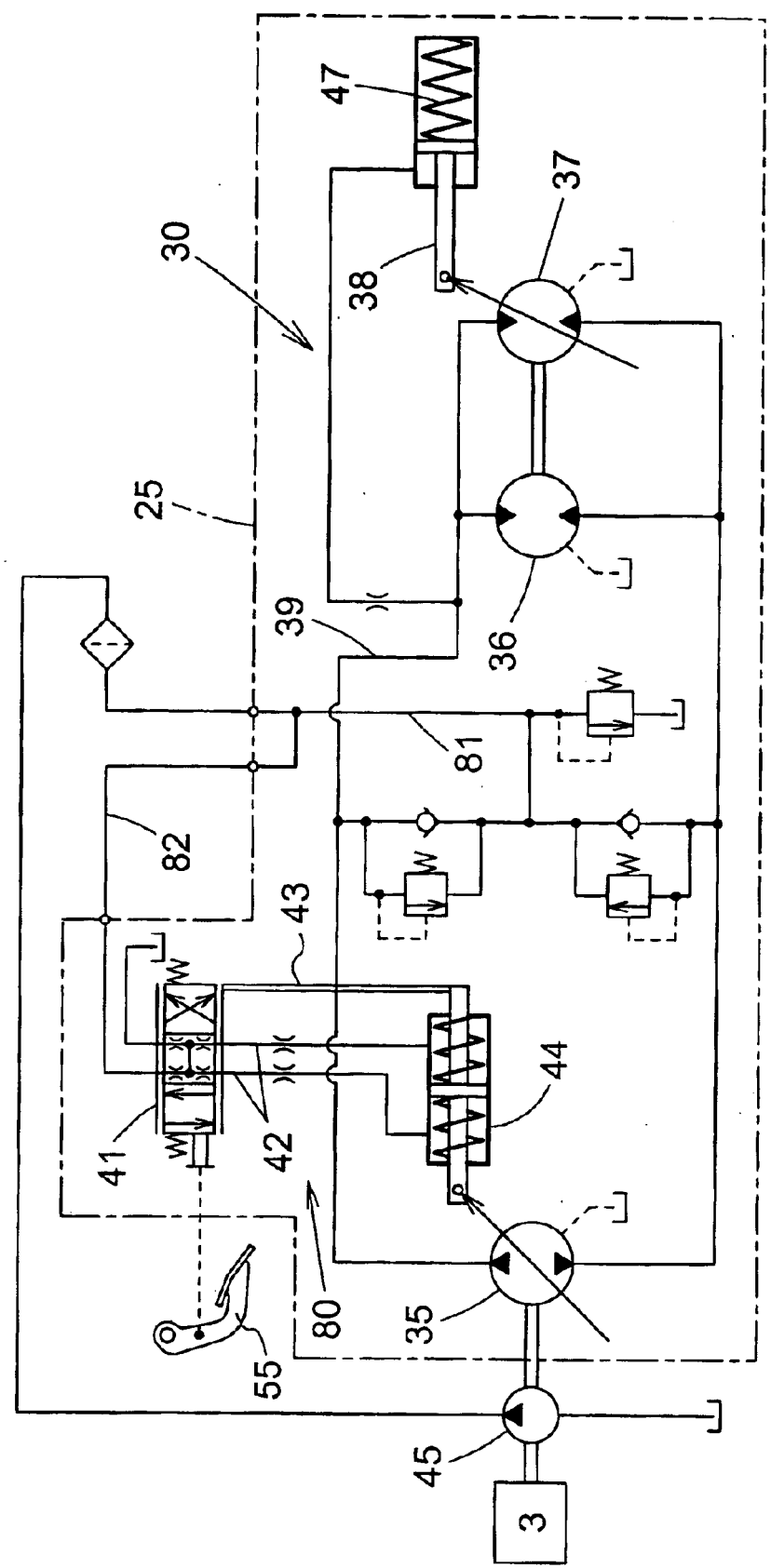
FIG. 9 is a hydraulic circuit diagram of the stepless transmission.

As understood from FIG. 9, the control piston 38 is connected to a pressure oil supply line 39 for supplying the main and auxiliary hydraulic motors 36 and 37 with pressure oil from the hydraulic pump 35. The angle of the swash plate 37a is stabilized when the pressure in the pressure oil supply line 39 balances the urging force of the return spring 47. An operation of automatic change speed control utilizing the control piston 38 will be described hereinafter.

The angle of the swash plate 35a of the hydraulic pump 35 becomes large when the shift pedal 55 is depressed, whereby pressure oil in an amount corresponding to the swash plate angle is discharged and supplied to the main and auxiliary motors 36 and 37. In this case, when a propelling load is in a range equal to or less than a predetermined range while the pressure in the pressure oil supply line 39 is also in a range equal to or less than a predetermined range, the initial urging force of the return spring 47 becomes greater than an advancing force of the control piston 38 receiving the pressure from the pressure oil supply line 39. Thus, as illustrated in FIG. 7, the angle of the swash plate 37a of the auxiliary hydraulic motor 37 is maintained in neutral (0°), the entire amount of pressure oil is supplied from the hydraulic pump 35 to the main hydraulic motor 36, and the output shaft 32 is driven only by the main hydraulic motor 36.

Figure 8:
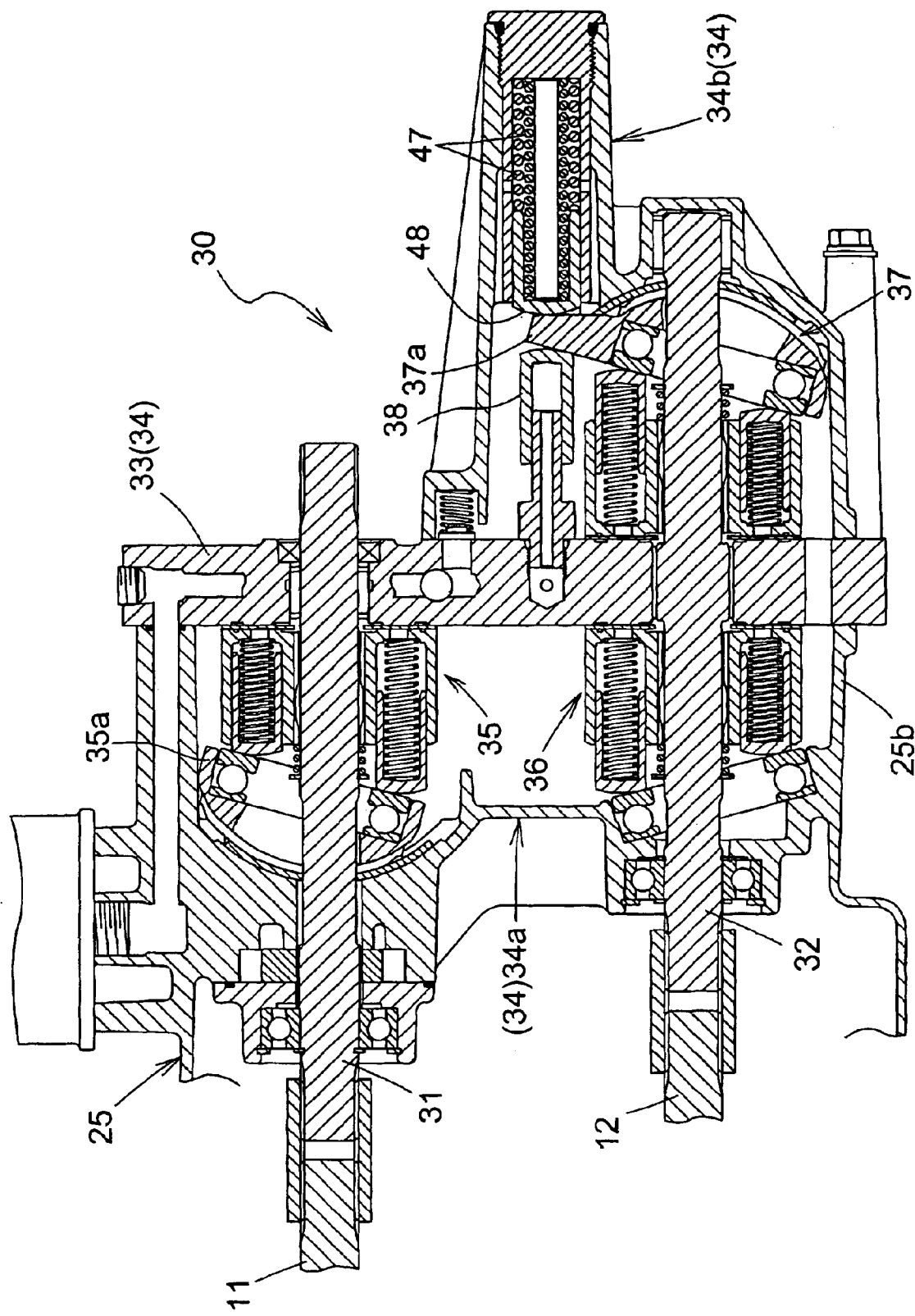
FIG. 8 is a sectional view of the stepless transmission in a state of running under a heavy load.

As the propelling load exceeds the predetermined range and the pressure in the pressure oil supply line 39 exceeds the predetermined range, the advancing force of the control piston 38 receiving the pressure from the pressure oil supply line 39 becomes greater than the initial urging force of the return spring 47. Then, as shown in FIG. 8, the angle of the swash plate 37a of the auxiliary hydraulic motor 37 becomes large to allow pressure oil to be supplied from the hydraulic pump 35 to the main and auxiliary hydraulic motors 36 and 37. More particularly, when the propelling load increases to the extent of exceeding the predetermined range, the total volume of pressure oil at the motors is increased to drive the output shaft 32 with a reduced speed thereby to increase output torque.

After the swash plate angle of the auxiliary hydraulic motor 37 reaches a maximum with an increase in the propelling load, the propelling load may increase still further. Then, the pressure in the pressure oil supply line 39 is further increased. In this condition, the pressure in the pressure oil supply line 39 acts as a reaction force for pushing the swash plate 35a of the hydraulic pump 35 back to the neutral position. In a normal load condition, the reaction force is supported by the servo cylinder 44 in the hydraulic servomechanism 80. However, when the pressure in the pressure oil supply line 39 becomes particularly high to increase the hydraulic reaction force applied to the swash plate 35a as noted above, the swash plate angle cannot be maintained by the servo cylinder 44 operated by the low system pressure equal to the charge pressure. As a result, the swash plate 35a is forcibly and automatically displaced toward the neutral position, namely to a lower speed, by the hydraulic reaction force to increase the pressure in the pressure oil supply line 39 thereby to increase the output torque.

The shift pedal 55 for operating the stepless transmission 30 also acts as an accelerator pedal for operating a speed adjusting device 50 provided laterally and rearwardly of the engine 3. A pedal control device will be described with reference to FIGS. 10 and 11.

The pedal control device includes the shift pedal 55 connected at an arm portion 55a thereof to a support shaft 56, an interlocking device 60 for interlocking the shift pedal 55 with a pivotable speed adjusting control 51 of the speed adjusting device 50 and with the pivotable change speed control 40 of the stepless transmission 30, and an automatic return mechanism 70 having a return spring 71.

With a depressing operation, the shift pedal 55 is pivoted downward about a transverse axis of the support shaft 56 by action of the depressing force to a depression limit where the arm portion 55a contacts a stopper consisting of a cable holder 57 as shown in FIG. 11. With release of the depressing operation, the pedal is pivoted upward about the axis of the support shaft 56 by action of an operating force of the return spring 71 to automatically return to a depression release position as shown in FIG. 10.

The interlocking device 60 includes a control cable 61 having an inner cable 61a connected at one end thereof to an output arm portion 55b extending from a base portion of the arm portion 55a of the shift pedal 55 and an outer cable supported at an end thereof by the cable holder 57, a pivotable interlocking member 63 connected at one free end thereof to the other end of the inner cable 61a of the control cable 61 through a connecting pin 62 to be pivotable relative to each other, a control cable 64 for the speed adjusting device having an inner cable 64a connected at one end thereof to the other free end of the pivotable interlocking member 63 through a connecting pin 65 to be pivotable relative to each other and connected at the other end thereof to the speed adjusting control 51 to operatively connect the pivotable interlocking member 63 to the speed adjusting control 51, and an interlocking rod 67 connected at one end thereof through a joint 66 to a position adjacent the one free end of the interlocking member 63 connected to the control cable 61 for the shift pedal and connected at the other end thereof through another joint 66 to the change speed control 40 for operatively connecting the pivotable interlocking member 63 to the change speed control 40.

Both the joints 66 for connecting the interlocking rod 67 to the pivotable interlocking member 63 and to the change speed control 40 include a rod member screwed to the interlocking rod 67, and a threaded member 66a connected at one end thereof to an end of the rod member to be pivotable relative to each other by utilizing a spherical surface and screwed at the other end thereof to the pivotable interlocking member 63 or the change speed control 40 by a connecting screw. Thus, the interlocking rod 67 is relatively pivotably connected to both the pivotable interlocking member 63 and the change speed control 40.

The interlocking member 63 is relatively pivotably connected to a support shaft 68 mounted on the transmission case 25 through a mounting boss portion 63a located between the connecting pin 65 connected to the control cable 64 for the speed adjusting device, the joint 66 connected to the interlocking rod 67 and the connecting pin 62 connected to the control cable 61 for the control device to be pivotable about an axis 68a of the support shaft 68 relative to the transmission case 25.

As illustrated in FIG. 10, the automatic return mechanism 70 includes a cam follower member 72 pivotable in unison with the mounting boss portion 63a of the pivotable interlocking member 63, a cam arm 74 relatively pivotably connected to a mounting boss portion 74a at one end of a support shaft 73 mounted on the transmission case 25 to be pivotable about the axis of the support shaft 73 relative to the transmission case 25, and the return spring 71 extending between the cam arm 74 and a spring hooking pin 75 fixed to the transmission case 25. The return spring 71 is operated to urge the cam arm 74 toward the pivotable interlocking member 63 to bring a cam 76 consisting of a roller attached to an intermediate portion of the cam arm 74 to contact a cam follower surface 72a of the cam follower member 72 thereby to urge and oscillate the pivotable interlocking member 63 to a stop position ST shown in FIG. 10.

Hence, the automatic return mechanism 70 urges the pivotable interlocking member 63 to the stop position ST by an elastic restoring force of the return spring 71 through the cam 76 and the cam follower member 72, whereby the change speed control 40 is automatically returned to a disengaged position where the stepless transmission 30 is in neutral while the speed adjusting control 51 is also automatically returned to an idling position, respectively. When the stepless transmission 30 is in neutral, the cam 76 is fitted into a recess 72b of the cam follower surface 72a to engage the cam 76 with the cam follower member 72. With this action, the change speed control 40 is positioned in the disengaged position to be prevented from vibrating and/or moving from the disengaged position by the hydraulic pressure acting on the swash plate 35a of the hydraulic pump 35.

The interlocking device 60 is constructed to operate the speed adjusting device 50 and the stepless transmission 30 in response to operation of the shift pedal 55 as described below. When the shift pedal 55 is depressed, the inner cable 61a of the control cable 61 is pulled by the depressing force to allow the control cable 61 to swing the pivotable interlocking member 63 in a direction of rotation UP. The inner cable 64a of the control cable 64 is in turn pulled by the pivotable interlocking member 63 to allow the control cable 64 to swing the control 51 of the speed adjusting device 50. Then, the speed adjusting device 50 is operated to high speed drive so that the engine 3 may have an increased rotating speed. At this time, the interlocking rod 67 is pulled by the pivotable interlocking member 63 to swing the control 40 of the stepless transmission 30 thereby to shift the stepless transmission 30 to high speed drive so as to increase the drive speed of the front and rear wheels.

With release of the shift pedal 55, the pivotable interlocking member 63 is pivoted to the stop position ST by the operating force of the return spring 71 of the automatic return mechanism 70. The inner cable 64a of the control cable 64 is loosened by the pivotable interlocking member 63 thereby to return the speed adjusting control 51 of the speed adjusting device 50 to the idling position by the restoring force of the speed adjusting device 50 and to return the rotating speed of the engine to the idling state. At this time, the interlocking rod 67 is pushed by the pivotable interlocking member 63 whereby the change speed control 40 of the stepless transmission 30 is returned to the disengaged position thereby to return the stepless transmission 30 to the neutral position.

[Modified Embodiment]

In the foregoing embodiment, the shift pedal 55 is utilized as a change speed control member for operating the stepless transmission 30. Instead, a shift lever may be utilized as the change speed control member.

What is claimed is:

1. A propelling transmission control apparatus for a working vehicle having a hydrostatic stepless transmission, the apparatus comprising:

a variable displacement type hydraulic pump with a swash plate angle variable to vary a displacement thereof;

a change speed control mechanism for converting a displacement of a control device by the operator to a control displacement for varying the swash plate angle of the hydraulic pump;

a main hydraulic motor and an auxiliary hydraulic motor connected in series to the hydraulic pump, the main hydraulic pump being a fixed displacement type having a fixed swash plate angle, the auxiliary hydraulic motor being a variable displacement type having a variable swash plate angle;

a common output shaft for receiving rotational output from the main and auxiliary motors; and a control piston for varying the swash plate angle of the auxiliary hydraulic motor, the control piston being connected to a pressure oil supply line for supplying the main and auxiliary hydraulic motors with pressure oil, to transmit pressure variations in the pressure oil supply line to the control piston;

wherein the control piston is operable to vary the swash plate angle of the auxiliary hydraulic motor such that the auxiliary hydraulic motor has an increased volume with a pressure increase applied to the control piston.

2. A propelling transmission control apparatus as defined in claim 1, wherein the change speed control mechanism includes a hydraulic servomechanism having a hydraulic servo valve operable in response to the displacement of the control device applied as a control input, and a servo cylinder for adjusting the swash plate angle of the hydraulic pump.

3. A propelling transmission control apparatus as defined in claim 2, wherein the hydraulic servomechanism has, applied thereto as a system pressure therefor, a charge pressure for a change speed hydraulic circuit having the main hydraulic pump and the main and auxiliary hydraulic motors.

4. A propelling transmission control apparatus as defined in claim 1, wherein the control device is operatively connected to a speed adjusting device for an engine, the speed adjusting device being operable to a high speed rotation in response to a shifting operation of the control device to high speed drive, and to a low speed rotation in response to a shifting operation of the control device to low speed drive.

* * * * *